United States Patent [19]

Logan et al.

[11] Patent Number: 4,521,861

[45] Date of Patent: Jun. 4, 1985

[54] METHOD AND APPARATUS FOR ENHANCING RADIOMETRIC IMAGING

[75] Inventors: Russell H. Logan, Richardson; Frank J. Poradish, Dallas, both of Tex.

[73] Assignee: Texas Instruments Incorporated, Dallas, Tex.

[21] Appl. No.: 373,583

[22] Filed: Apr. 30, 1982

[51] Int. Cl.³ .................. G08C 9/00; G01S 13/00; G01S 15/00; G06G 7/48
[52] U.S. Cl. .................. 364/517; 343/351; 364/423; 382/6; 382/54
[58] Field of Search .............. 364/423, 514, 516, 517, 364/414; 250/250; 382/6, 54; 343/351, 5 MM, 5 PD, 5 CE

[56] References Cited

U.S. PATENT DOCUMENTS

| 3,599,211 | 8/1971 | Mardon | 343/351 |
|---|---|---|---|
| 3,787,857 | 1/1974 | Lazarchik et al. | 343/351 |
| 3,827,027 | 7/1974 | Towson et al. | 364/900 |
| 3,921,169 | 7/1975 | Lazarchik et al. | 343/351 |
| 4,115,776 | 9/1978 | Roeder et al. | 343/351 |
| 4,158,854 | 6/1979 | Duinker | 358/111 |
| 4,292,638 | 9/1981 | Lazarchik et al. | 343/351 |
| 4,325,257 | 4/1982 | Kino et al. | 364/604 |
| 4,335,427 | 6/1982 | Hunt et al. | 382/54 |
| 4,347,515 | 8/1982 | Hoover, Jr. | 343/351 |

FOREIGN PATENT DOCUMENTS 495917  4/1977  Australia .................. 364/414

OTHER PUBLICATIONS

Gonzalez et al., Digital Image Processing, pp. 6-11, and 199-207, Addison-Wesley Publishing Co., Reading, Massachusetts, 1977.
The Coming of MM-Wave Forward Looking Imaging Radiometers, Schuchardt et al., Microwave Journal, Jun. 1981, pp. 45-62.

Primary Examiner—Raulfe B. Zache
Assistant Examiner—Dale M. Shaw
Attorney, Agent, or Firm—Alva H. Bandy; Leo N. Heiting; Melvin Sharp

[57] ABSTRACT

Disclosed is a method and apparatus for enhancing target detection, particularly in the millimeter wave frequency range, through the utilization of an imaging radiometer. The radiometer, which is a passive thermal receiver, detects the reflected and emitted thermal radiation of targets within a predetermined antenna/receiver beamwidth. By scanning the radiometer over a target area, a thermal image is created. At millimeter wave frequencies, the received emissions from the target area are highly dependent on the emissivity of the target of interest. Foliage will appear "hot" due to its high emissivity and metals will appear cold due to their low emissivities. A noise power illuminator is periodically actuated to illuminate the target of interest. When the illuminator is actuated, the role of emissivity is reversed, namely poorly emissive targets will generally be good reflectors which in the presence of an illuminator will appear "hot". The highly emissive targets (such as foliage and dirt) which absorb most of the transmitted energy will appear almost the same as in a non-illuminated, passive image. Using a data processor, the intensity of the passive image is subtracted from the intensity of the illuminated, active image which thereby cancels the background foliage, dirt, etc. and the reflective metallic targets are enhanced.

7 Claims, 10 Drawing Figures

METHOD AND APPARATUS FOR ENHANCING RADIOMETRIC IMAGING

This invention relates to a method and apparatus for enhancing the contrast of radiometric images and more particularly to a method and apparatus for enhancing the contrast and target detection of an area of interest by subtracting the intensities of the passive image of the area of interest from the intensities from the illuminated image of the same area of interest.

Millimeter wave radiometers have existed for many years in the laboratory and in a few specialized applications. The construction of different types of radiometers is discussed in Skolnik, M. I., *Radar Handbook*, McGraw Hill, 1970, chapter 39. Skolnik discusses in chapter 39 the construction and performance characteristics of various radiometer antennas and receivers as well as applications for radiometers, such as in radio astronomy, mapping, atmospheric sounding as well as for tracking and target identification. Skolnik discusses in section 39.6 on page 39-34 the system aspects of radiometery and indicates that radiometric systems for mapping, tracking or target identification all must successfully discriminate between the desired target signal and the background radiation. Skolnik points out in section 39.6 the advantages and disadvantages of radiometery versus radar for mapping, tracking and target identification. Skolnik also points out that direct comparison of radar and radiometric signals is difficult since large contributors to the radar cross-section, such as corners, edges and reflections at normal incidence to flat or curved surfaces, have little radiometric significance. However, smooth surfaces at angles reflecting the sky toward the radiometery produce a maximum contrast with a background near ambient. Skolnik further points out that except for bodies of water, such surfaces are rare in nature but common in man-made objects of all kinds. Skolnik further states that radiometric target signatures therefore offer a different discrimination capability than does radar and that this, coupled with the self-concealment of passive operation, confers significant advantages on radiometric sensors for some applications.

Other commentators such as Schuchardt, J. M. et al, "Advanced Milimeter Wave Imaging Systems", SOUTHEASTCON Symposium Digest, April 1980, Moore, R. P. et al, "Position Updating with Microwave Radiometric Sensors", NAECON '76 Record, Seashore, C. R., et al, "MM-Wave Radar and Radiometer Sensors for Guidance Systems", *Microwave Journal*, August 1979 and Schuchardt, J. M., et al, "The Coming of MM-Wave Forward Looking Radiometers", *Microwave Journal*, June 1981 have also all described passive, non-illuminative millimeter wave radiometers. These commentators suggest that several factors contribute to the signal received by a radiometer which are as follows:

1. The object's physical temperature,
2. The object's emmisivity (or its reflectivity),
3. The surrounding medium temperature, and
4. The ratio of the object area to the radiometer beam spot.

However, all of these prior art systems discussed by the preceding commentators suffer from the same malady, namely the target detection and the image contrast achievable in passive, non-illuminated targets produce very poor pictures of the target area of interest.

Accordingly, it is an object of the present invention to provide an improved method and apparatus for enhancing the contrast of radiometric images.

Another object of the present invention is to provide a stealthy, covert all-weather sensing system.

Another object of the present invention is to provide an improved radiometric imaging system preferably in the millimeter frequency range for improved resolution and performance in adverse weather conditions.

Another object of the present invention is to provide a method and apparatus for producing a bistatic illuminator and radiometric system for generating a non-illuminated and an illuminated thermal image of a scene of interest.

Still another object of the present invention is to provide a bistatic illuminator and radiometer which improves the contrast of materials having a reflectivity greater than zero.

Still another object of the present invention is to provide a method and apparatus for producing an enhanced imaging system which can be used in tactical applications to detect metallic objects of interest.

A still further object of the present invention is to provide an improved radiometric imaging system which is a simple, low cost, economical system which produces enhanced imaging data.

Other objects and features of the invention will become more readily understood from the following detailed description and appended claims when read in conjunction with the accompanying drawings, in which like reference numerals designate like parts throughout the figures thereof, and in which:

Contemporary radiometers use very sensitive passive receivers which detect the reflected and emitted thermal radiation of bodies and materials which are at temperatures above absolute zero. The output of a radiometer is proportional to the intensity of observed radiation within the bandwidth of the receiver. In a typical radiometric imaging system, the antenna is scanned over a target area and the combined intensity and position information is processed to form a map or perspective image.

At millimeter wave frequencies, the power received from a beam filling target due to its thermal emissions is given by:

$$P_r = \epsilon \beta k T_t \tag{1}$$

where $P_r$ = Received power (watts)
$\epsilon$ = Emissivity of the target
$\beta$ = Receiver bandwidth (sec$^{-1}$)
k = Boltzmann's constant (J/°K.)
$T_t$ = Temperature of target (°K.)

The emissivity of a material is a function of the type of material, the surface roughness, the frequency, and the angle of observation. Some typical emissivities at 36 GHz are presented in Table I below.

TABLE I

| Emmissivities at 36 GHz | |
|---|---|
| Material | Emissivity ($\epsilon$) |
| Rough Dry Soil | .99 |
| Concrete | .85 |
| Moist Soil | .60 |
| Water | .40 |
| Grass | .95 |
| Trees | .95 |
| Metal | <.10 |

The reflectance ($\rho$) of an opaque material is related to the emissivity by:

$$\rho = 1 - \epsilon \qquad (2)$$

Therefore, targets with low emissivities with reflect the apparent temperature of the surroundings which will generally be some combination of sky temperature and local ambient temperature depending on the viewing angle. If a transmitter is present, additional energy will be reflected to the radiometer like a conventional radar. The following generalized equation represents the total reflected and emitted energy received by a radiometer from a beam filling target. Losses and emissions of the atmosphere have also been included.

$$P_R = \epsilon \beta K T_t 10^{-\alpha R/10} + (1 - \epsilon) \beta K T_s 10^{-\alpha R/10} +$$

$$(1 - 10^{-\alpha R/10}) \beta K T_{amb} \beta +$$

$$\frac{P_T G_T R_R \sigma \lambda^2}{(4\pi)^3 R^4} 10^{-2\alpha R/10}$$

$P_R$ = Total power received
$\epsilon$ = Emissivity
$\beta$ = Bandwidth
k = Boltzmann's constant
$T_t$ = Absolute target temperature
$\alpha$ = Atmospheric loss factor
R = Range
$T_s$ = Apparent temperature of the surroundings
$T_{amb}$ = Ambient temperature of the atmosphere
$P_T$ = Transmitted power
$G_T$ = Gain of the transmitting antenna
$G_R$ = Gain of the receiving antenna
$\lambda$ = Wavelength
$\sigma$ = Radar cross section In realistic imaging situations, the actual beamwidth covers many targets with different reflective and emissive properties. All targets within the beam must be added together with the appropriate gain and beamfill weighting factors to determine the total power. The beamfill weighting factor ($\Gamma$) is given by:

$$\Gamma = \frac{A_T G_R}{4\pi R^2} \qquad (4)$$

where $A_T$ = Area of target

The atmospheric loss factor ($\alpha$) in Equation 3 represents an average value along the length of the beam.

An effective antenna temperature ($T_{eff}$) can now be defined.

$$T_{eff} = P_R/(k\epsilon) \qquad (5)$$

The output level of a radiometer with an input power of $P_R$ is equivalent to the output of a receiver with a resistor, at temperature $T_{eff}$, across the input terminals.

The minimum discernable temperature ($\Delta T_{min}$) is often used to describe a radiometer's sensitivity.

$$\Delta T_{min} = C(T_{eff} + T_{rcvr})/(\beta \tau)^{\frac{1}{2}} \qquad (6)$$

where:
C = constant determined by system configuration
C = 1 for total power receiver
C = $\frac{1}{2}$ for a Dicke radiometer
$T_{eff}$ = Effective antenna temperature
$T_{rcvr}$ = Receiver noise temperature = $(L_S F_R - 1) T_o$
$L_S$ = System losses
$F_R$ = Receiver figure of merit
$T_o$ = System ambient temperature
$\beta$ = IF bandwidth
$\tau$ = Post detection integration time Typical $\Delta T_{min}$'s range from less than 0.1° K. to more than 10° K. depending on the application.

For most applications, radiometers are designed to operate at frequencies where there is a dip in the atmospheric absorption spectrum. These "window" frequencies allow the radiometer to see greater distances through normal and adverse weather conditions. Table II presents the four most popular millimeter wave window frequencies and some typical loss factors for varying weather conditions. Table II follows.

TABLE II

| Nominal Atmospheric Loss Factors (dB/km) | | | | |
|---|---|---|---|---|
| | 35 GHz | 95 GHz | 140 GHz | 220 GHz |
| Clear | 0.10 | 0.40 | 1.6 | 4.0 |
| Fog | 0.16 | 0.75 | 2.3 | 4.5 |
| Rain (4 mm/hr) | 1.00 | 3.40 | 4.8 | 6.0 |

35 GHz (Ka-Band) is currently the most common choice for tactical situations due to the low attenuation factors and availability of components.

Figure 1:
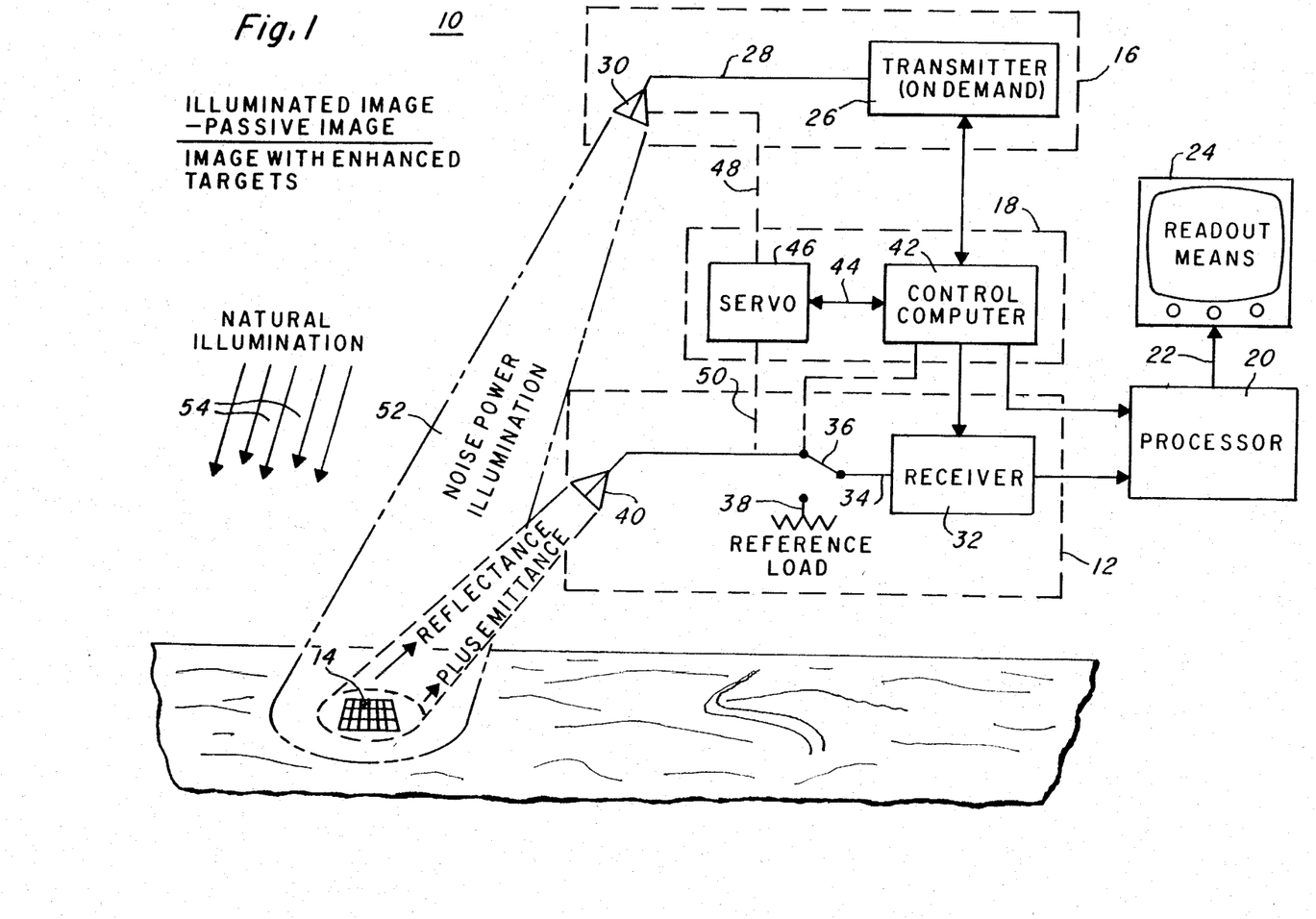
FIG. 1 illustrates a simplified block diagram of a radiometric imaging system according to the present invention.

Referring now to FIG. 1, there is illustrated a radiometric imaging system 10 constructed according to the present invention. Imaging system 10 is comprised of a radiometer 12 which receives and measures the intensity of incoming electromagnetic radiation in a predetermined frequency band from a target of interest 14. Imaging system 10 is also comprised of an illuminator means 16 which produces continuous random electromagnetic energy and which periodically illuminates the target of interest 14. Illuminator 16 is a bistatic noise power illuminator. Illuminator 16 is not constrained to radiating only noise power but it may in general radiate illuminative energy that occupies any part or all of the radiometric receiver bandwidth. Control means 18, is coupled to both illuminator 16 and radiometer 12, and selectively causes radiometer 12 to measure the thermal intensity of the non-illuminated target area 14 and then activates the illuminator 16 thereby causing radiometer 12 to measure the intensity of target 14 when illuminated. Processor 20 is a digital processor which subtracts the corresponding intensities of the non-illuminated target area 14 from the intensity of the illuminated target area 14 (when illuminated by illuminator 16) to provide enhanced target detection. Processor 20 may produce signals on line 22 to readout means 24. In one embodiment, the readout means may be a CRT display for visually producing an enhanced image of the target area 14 of interest.

In an alternate embodiment the control means 18 need not be coupled to both the illuminator 16 and the receiver/processor 32 and 20, but the illuminator may be remotely located and self-controlled in a periodic or aperiodic manner with the passive receiver 32 and processor 20 sensing the difference, change or ratio between illuminated and non-illuminated target area. Still further, the illuminator means 16 may be a plurality of illuminators associated with system 10 or remote therefrom.

Bistatic illuminator 16 is comprised of a transmitter 26 coupled by line 28 to transmitter antenna 30. Similarly, radiometer 12 is comprised of a receiver 32 coupled by conductor 34 to a switch means 36 which alternately connects the receiver 32 either to a reference load 38 or to receiver antenna 40. Control means 18 is comprised of a control computer 42 which is coupled by way of bus 44 to servo means 46. Servo means 46 generates servo signals which are transmitted by way of lines 48 and 50 to transmitter antenna 30 and receiver antenna 40, respectively.

The radiometric imaging system 10 illustrated in FIG. 1 additionally provides an illuminator 16 (which is periodically activated by control means 18) to illuminate the target of interest 14 with continuous wave (CW) noise power over antenna beamwidth 52. By spreading out the power of transmitter 26 over the entire bandwidth of receiver 32, the peak power of system 10 is kept low and covertness is preserved. Receiver 32 is calibrated by an external reference load 38 as required. State of the art receiver circuits are capable of maintaining calibration (without update) for several minutes. Control means 18, comprised of the control computer 42 and servo 46, serves to coordinate servo functions, transmitter power, data sampling, etc. Pointing information for antenna 30 and antenna 40 as well as intensity data received from target 14 are sent to processor 20 where processing occurs, such as motion compensation, coordinate transformation, inverse filtering and histogram equalization, by way of example.

Strictly passive imaging offers the highest degree of covertness and is usable for local scene viewing, ground mapping and weather avoidance functions. A passive terrain image is basically a measure of the differences in emissivity within the target area since most of the resolvable targets are very close to ambient temperature. Therefore, trees, soil, roads, water, and structures will be visible due to their different emissivities. Metallic targets generally appear as cold spots because of the reflected sky temperature. Since image resolution decreases with range, passive ground mapping is generally not practical for tactical navigation and weapons delivery.

The imaging system 10 disclosed in FIG. 1 includes illuminator 16 which provides improved contrast of tactical targets while preserving most of the convertness of the prior-art passive systems. Transmitter 26 in illuminator 16 generates a few watts or less of CW noise power spread over the front end bandwidth of receiver 32 which provides substantial target contrast enhancement with a very low probability of intercept. As with passive terrain imagery, when noise power is transmitted on beamwidth 52 to illuminate target 14, the illuminated target 14 produces an illuminated image which is again a measure of the emissivities of the scanned targets but in an inverted sense. Emissive targets, (such as trees, grass, water, concrete, etc.) will now appear cold relative to reflective targets (such as metal). When the intensities of a passive image (without illumination from illuminator 16) is subtracted from a coincident illuminated image (that is, an image of target area 14 which is illuminated by illuminator 16), the emissive background terrain will tend to cancel while a highly reflective metallic target will be enhanced. This provides a much improved target-to-background contrast ratio.

Figure 2:
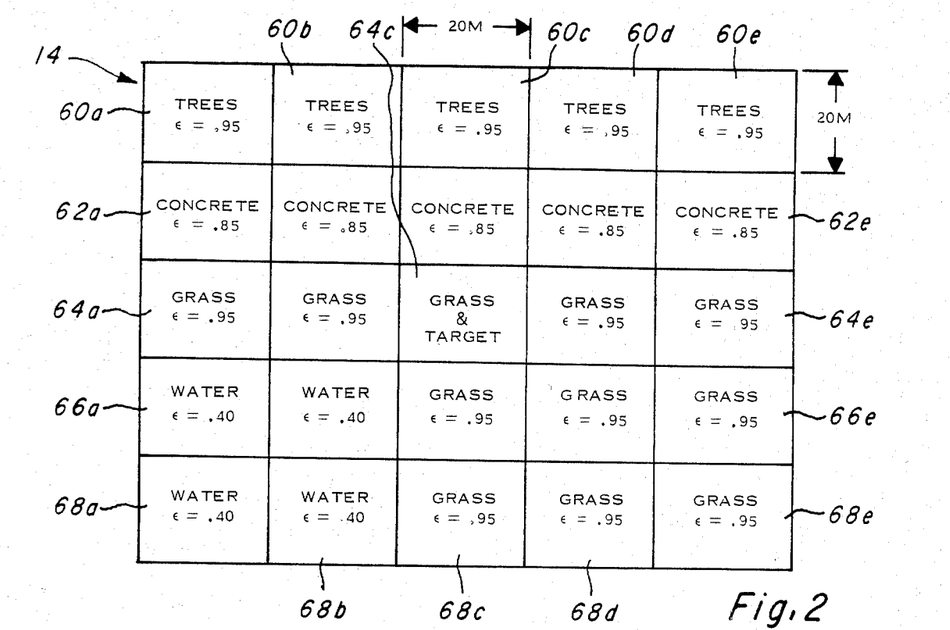
FIG. 2 illustrates the emissivities of a typical target of interest.

This can be seen more clearly from FIGS. 2–5 which illustrate a hypothetical target area, such as target 14 illustrated in FIG. 1. Referring to FIG. 2, the target area 14 is comprised of a plurality of rows of blocks 60a–60e, 62a–62e, 64a–64e, 66a–66e and 68a–68e. Each block represents one beamspread of an identified material. For example, block 60a represents trees having an emissivity of 0.95, block 62a is concrete having an emissivity of 0.85, block 66a is comprised of water having an emissivity of 0.40 while center block 64c has an additional metallic target with an emissivity of 0.10 which occupies 50% of the beamspread and has a radar cross-section of 50 m². All targets are assumed to be at or near some prevailing ambient temperature (normally, 290 degrees K.).

Figure 3:
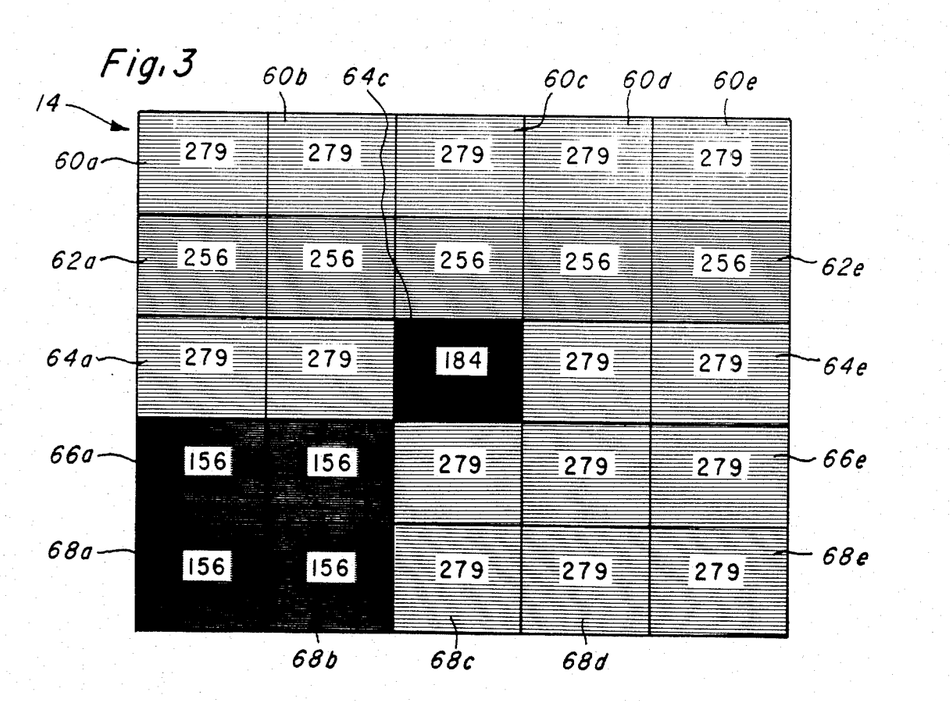
FIG. 3 illustrates a passive thermal image of the target of interest.

FIG. 3 illustrates the effective temperatures of the target blocks (characterized in FIG. 2) as viewed by a radiometer, such as radiometer 12 (in FIG. 1) at a range of 3 km. As can be seen from the temperature profiles in FIG. 3, the water blocks (blocks 66a–b and 68a–b) when compared to the center block 64c (which includes the metallic target of interest) appear at nearly the same temperature which would make classification and discrimination very difficult. The water blocks are shown to be 156 degrees Kelvin while the center block 64c which includes the target is at 184 degrees Kelvin. It will be noted from observation of the remaining effective temperatures in the other target blocks that such temperatures are in excess of 256 degrees Kelvin. These effective temperatures emanating from the targets illustrated in FIG. 2 are the result of natural thermal emissions as well as reflected natural illumination 54 impinging on target 14. During the period of operation of system 10, transmitter 26 is disabled (i.e., not transmitting) and radiometer 12 is detecting via antenna 40 and receiver 32 representations of the intensities of the various blocks shown in FIG. 3 and storing these signals in processor 20. When only the natural illumination 54 is being measured by radiometer 12, the temperature intensities illustrated in FIG. 3 represents a passive thermal image of the target area 14.

Figure 4:
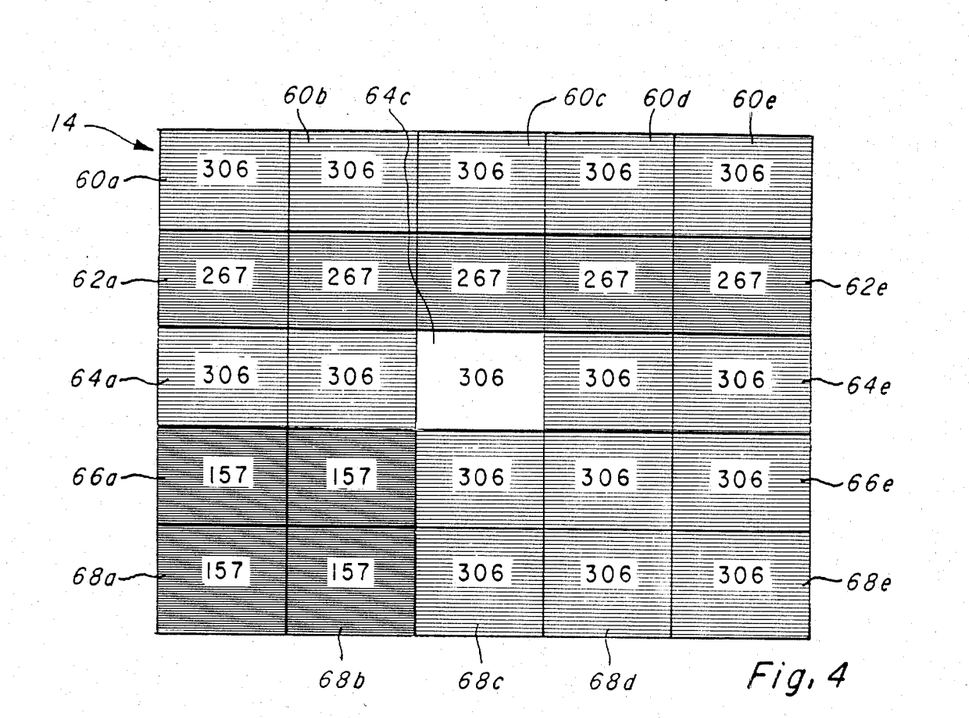
FIG. 4 illustrates the thermal image of the target when illuminated by an illuminator.

FIG. 4 illustrates the same target area 14 as it may appear when illuminated by illuminator 16 (in FIG. 1) with perhaps only 200 milliwatts of noise power. The relatively large radar cross-section of the metallic target in block 64c (in FIGS. 2–5) greatly increases the effective temperature of the center block 64c while the background terrain illustrated in FIG. 4 remains largely unchanged. In other words, FIG. 4 represents the target area 14 when illuminated with continuous random electromagnetic energy (noise power) and represents the thermal image of the intensities of the illuminated target area 14. Referring to FIG. 1, during a predetermined time period prescribed by control computer 42, transmitter 26 in illuminator 16 is activated and generates signals on line 28 to antenna 30 to thereby provide the 200 milliwatts of noise power to target 14. Radiometer 12, and more particularly antenna 40 and receiver 32, sense the illuminated thermal image of target 14 and transmitts the intensities illustrated in FIG. 4 to processor 20. If the thermal image illustrated in FIG. 4 were the only image available, it would still be difficult to classify center block 64c as containing a man-made metallic target since its effective temperature (333 degrees Kelvin) is very similar in magnitude to the effective temperatures of the background foliage (namely blocks 60a–e, 62a–e, 64a–e, 66c–e and 68c–e). However, if the information from both the passive image (FIG. 3) and the illuminated image (FIG. 4) of target 14 is utilized, the target-to-background contrast can be substantially improved.

Figure 5:
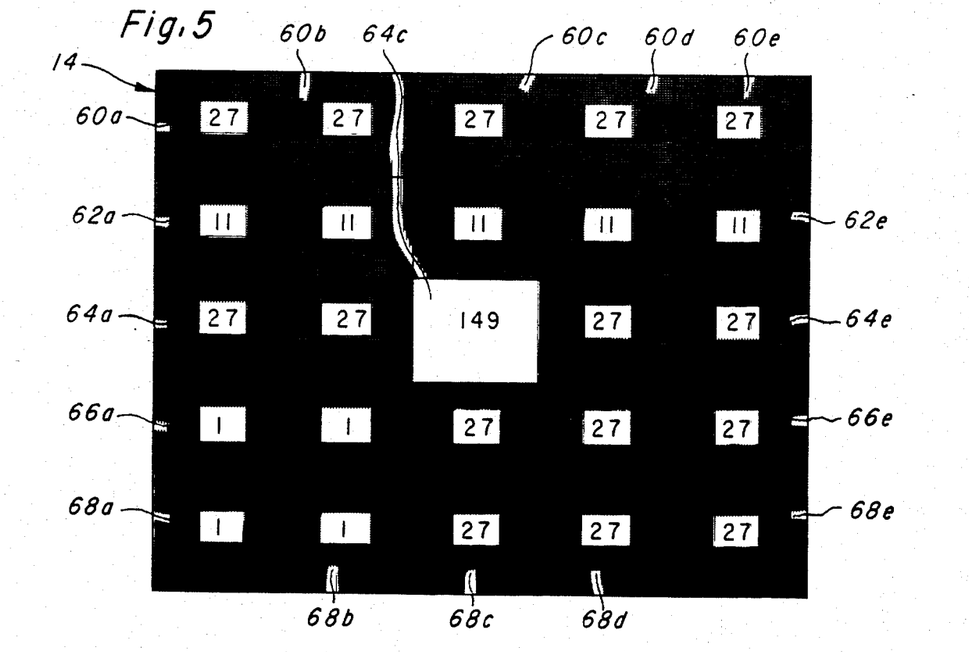
FIG. 5 illustrates the thermal image produced when the passive thermal image is subtracted from the illuminated thermal image.

FIG. 5 shows a thermal image created by subtracting the intensities of the passive thermal image illustrated in FIG. 3 from the corresponding intensities of the illuminated thermal image illustrated in FIG. 4. This subtraction process is performed in processor 20 of FIG. 1. As can be seen from FIG. 5, the center block 64c has a thermal temperature of 149 degrees Kelvin which is substantially larger than any of the surrounding temperatures which would indicate the presence of a man-made target, such as a metal object. As pointed out previously, when the target area 14 of interest is illuminated by illuminator 16, the illuminated thermal image detected by radiometer 12 is a measure of the emissivities of the scanned targets but in an inverted sense. That is, emissive targets (such as trees, grass, etc.) will appear cold relative to a reflecting target (such as a metal). Therefore when a passive image such as that illustrated in FIG. 3 is subtracted from the illuminated image illustrated in FIG. 4, the emissive background terrain will tend to cancel (resulting in a small thermal temperature such as is illustrated in FIG. 5) while a highly reflective metal target will remain basically unchanged; this will therefore produce a very high thermal temperature when a sufficiently large metallic object is present (resulting in a temperature of 149 degrees in block 64c in FIG. 5). Therefore when the passive image is subtracted from the illuminated image, a thermal image (in FIG. 5) results which provides enhanced target detection capabilities.

The following assumptions were used in the calculation of the effective temperatures from target 14:

$P_T = 0.20$ watts
$G_T = 38$ dB
$G_R = 52$ dB
$\lambda = 0.0083$ m
$\alpha = 0.10$ dB/km
$R = 3$ km
$\sigma$ (trees) = $\sigma$ (grass) = 10 m$^2$
$\sigma$ (concrete) = 4 m$^2$
$\sigma$ (water) = 0.4 m$^2$
$\sigma$ (target) = 50 m$^2$
$\beta = 2$ GHz
$k = 1.38 \times 10^{-23}$ J/°K.
$T_{amb} = 290°$ K.
$T_{sky} = 50°$ K.

Figure 6:
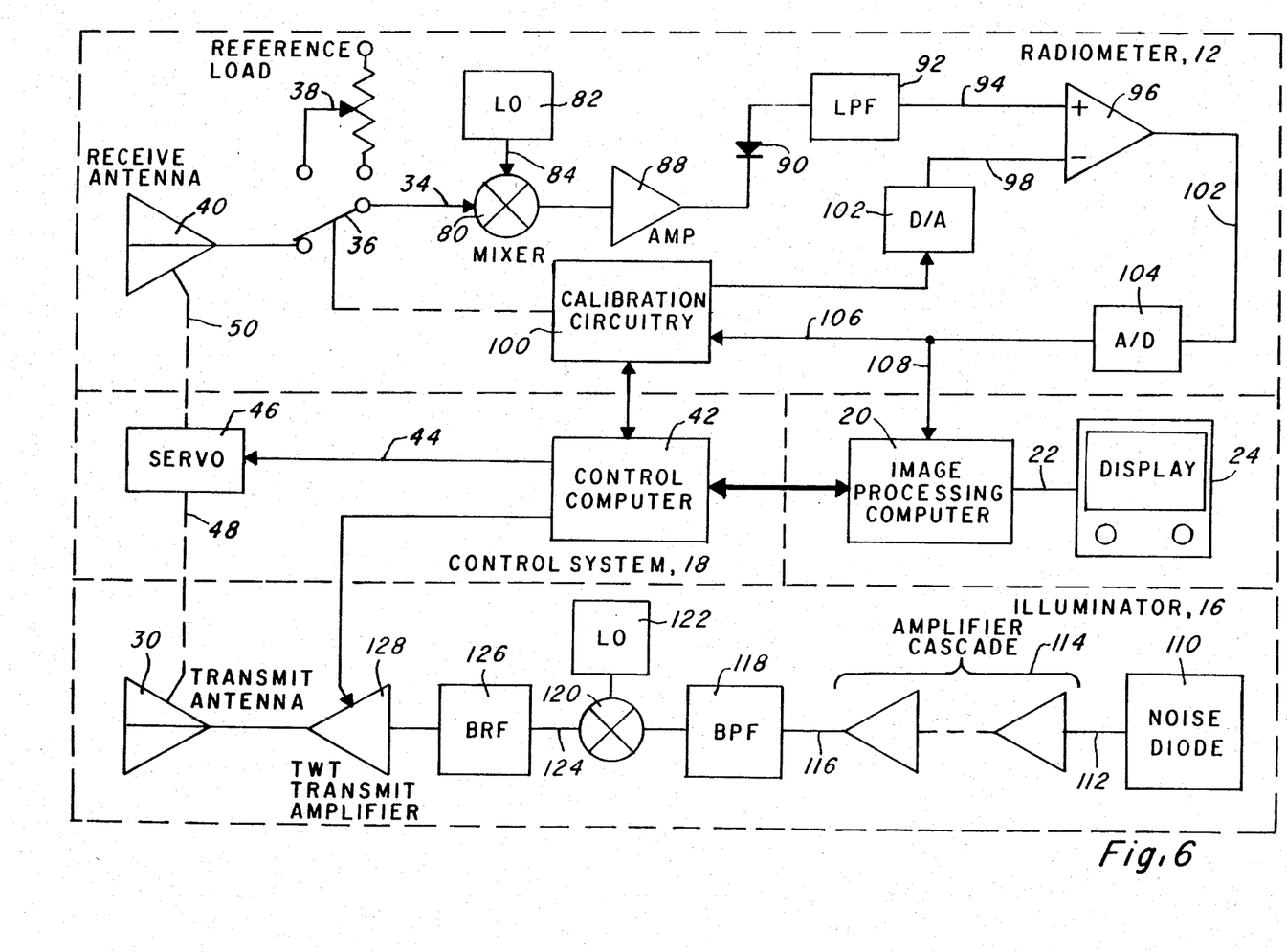
FIG. 6 is a more detailed block diagram of the system of FIG. 1.

FIG. 6 illustrates a more detailed block diagram of the imaging system 10 illustrated in FIG. 1 and is comprised of a radiometer 12, an illuminator 16, a control computer system 18, an image processing computer 20 and a display 24.

Radiometer 12 is comprised of a receive antenna 40 which is servo controlled by servo circuit 46 which mechanically is coupled to receive antenna 40 by line 50. Receive antenna 40 is tuned to operate in the band of the receiver in order to minimize losses. As mentioned earlier, imaging system 10 is designed to operate at frequencies where there is a dip in the atmospheric absorption spectrum in order that the radiometer 12 can "see" at greater distances through normal and adverse weather conditions. This is typically at frequencies approximating 35 GHz, 95 GHz, 140 GHz, and 220 GHz as pointed out in Table II above. Other "window frequencies" are known to exist at infrared and neighboring frequencies. Frequency down-conversion is accomplished in the double sideband mixer 80 from the local oscillator 82 which generates a local oscillator frequency on line 84 which thereby produces a down converted signal on line 86. This down converted signal on line 86 is amplified and filtered in amplifier 88 and then detected by a square law diode detector 90. The output from diode detector 90 goes through low pass filter 92 which eliminates ripple and produces a dc signal at different levels proportional to the thermal energy sensed by radiometer 12. The output from low pass filter 92 is coupled by way of conductor 94 to the positive terminal of difference amplifier 96. This output voltage on conductor 94 applied to the positive terminal of amplifier 96 is amplified relative to a reference voltage on line 98 applied to the negative terminal of amplifier 96. This reference voltage on line 98 is set by calibration circuitry 100 (and d/a converter 101) when the radiometer 12 is switched by switch 36 to the known reference load 38. Calibration circuitry 100, therefore, applies an offset voltage (the signal on line 98) into amplifier 96 which insures that the output from amplifier 96 on line 102 is zero when the switch 36 is connected to the known reference load 38. The final output voltage on line 102 (when switch 36 is connected to receive antenna 40) is proportional to the difference between the power received by receive antenna 40 and the power emitted by the reference load. In the millimeter waveband, the received power is linearly proportional to the absolute temperature of the observed body according to the following equation:

$$P_r = \epsilon K \beta T_{abs}$$

where
$P_r$ = power received
$\epsilon$ = emissivity
k = Boltzmann's constant
$\beta$ = Bandwidth
$T_{abs}$ = Absolute Temperature The output signal on line 102 goes through A/D converter 104. The output from A to D converter 104 is transmitted both to calibration circuitry 100 on line 106 as well as to the image processing computer 20 on line 108. Other radiometer embodiments which can be utilized in the present invention are described in Skolnik, M. I., *Radar Handbook* referenced above.

Illuminator 16 is comprised of a noise diode 110 which is connected by way of line 112 to generate wideband random noise which in turn is amplified by a cascade of amplifiers 114. The output from amplifier 114 on line 116 is then band limited by bandpass filter 118 and then upconverted to the transmit frequency by double sideband mixer 120 and local oscillator 122; the local oscillator 82 and 122 may be combined if so desired. The output from mixer 120 on line 124 is filtered in bandreject filter 126 to remove the local oscillator frequency. The output from filter 126 is then amplified in transmit amplifier 128 to the transmit power level and then transmitted on transmit antenna 30. The output power levels and durations are controlled by the control computer 42 and servo 46 which further controls antenna pointing, data collection and other miscellaneous functions.

A separate image processing computer 20 may be used to accommodate the memory requirements of the system. Computer 20 transforms the serially collected data into an image array to thereby provide a tv video drive to display on display 24 the results of the image subtraction described earlier. The image processing computer will perform the same function to display the thermal image of the target as a digital scan converter. A typical digital scan converter that could be used is described in U.S. Pat. No. 3,827,027 entitled "Method and Apparatus for Producing Variable Formats from a Digital Memory" issued July 30, 1974. Image subtraction is performed after coincident passive and illuminated image data has been collected and stored in computer 20. The image data can be analyzed for specific properties such as target size, temperature, location, etc., or just displayed as a perspective image. Inverse filtering (which will be described hereinafter) as well as other processing may be performed in processor 20.

The resolution of radiometer 12 has traditionally been determined by the diameter of the antenna beam over the target area 14. Any target 14 which is smaller than the beamspread will have its intensity averaged with the other targets in the beam. This averaging process is equivalent to a two dimensional spatial low pass filter, and will smear all edges and details smaller than a beamspread.

Figure 7:
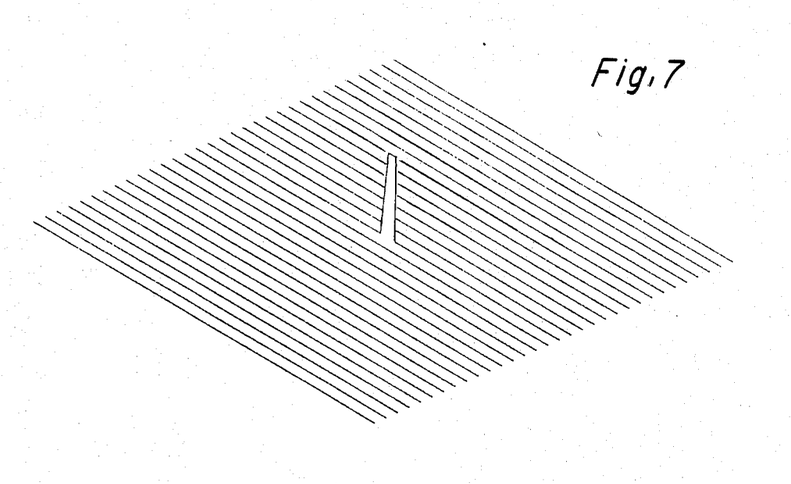
FIGS. 7-9 illustrates the effect of inverse filtering of the radiometer data.
Figure 8:
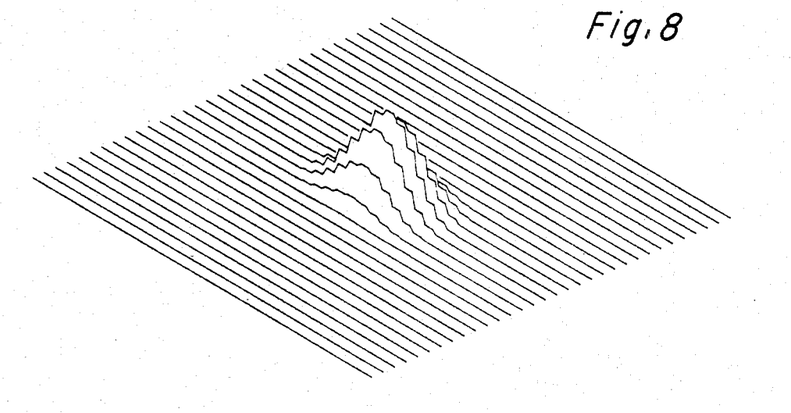
Figure 9:
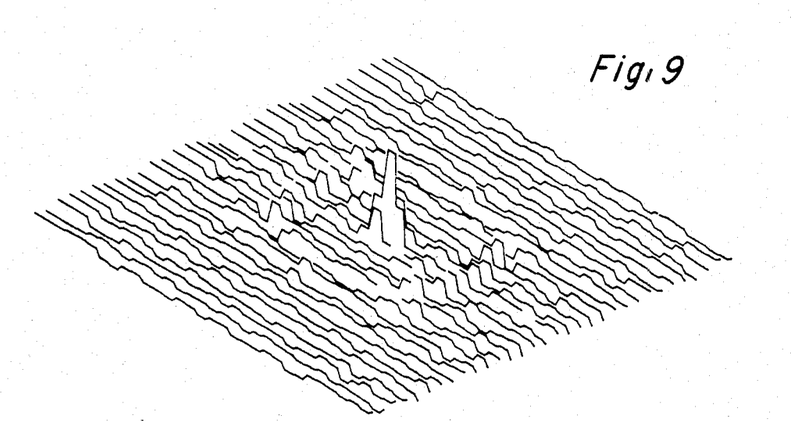

The ideal inverse filter is a spatial high pass filter that cancels the low pass filter effect and restores a flat spatial frequency response to the image. In practical applications the amount of high frequency restoration will be limited by the sample spacing and the signal-to-noise ratio of the data. Sharper images can be obtained at the expense of longer integration times and more samples of the target area. FIG. 7 shows a graphical representation of a single pixel point target (infinite resolution) prior to imaging. FIG. 8 shows the smearing effects of a radiometer with a 4 pixel×6 pixel beamwidth. If the data points of the smeared image are known to within 0.4% of the dynamic range (8 bits), the image can be restored as shown in FIG. 9. Typical images can generally be restored to a resolution of one half to one sixth of a beamwidth. The elements of a digital image processing system and algorithm for the inverse filter is set forth in Rafael G. Gonzalez and Paul Wintz's book entitled "Digital Image Processing", Sections 1.3 ELEMENTS OF A DIGITAL IMAGE PROCESSING SYSTEM, pages 6–11 and 5.4 INVERSE FILTERING, pages 199–207.

The radiometric imaging system illustrated in FIGS. 1 and 6 and described hereinabove contemplates the radiometer 12 and antenna 40 successively or sequentially measuring the non-illuminated thermal image from target 14 and then (upon activating illuminator 16) measuring the illuminated thermal image from the target area 14 at a different time. In an airborne environment where the speed of the aircraft is or may be a factor, it may be desirable to receive and measure simultaneously in radiometer 12 both the passive non-illuminated thermal image as well as the illuminated thermal image from target 14.

Figure 10:
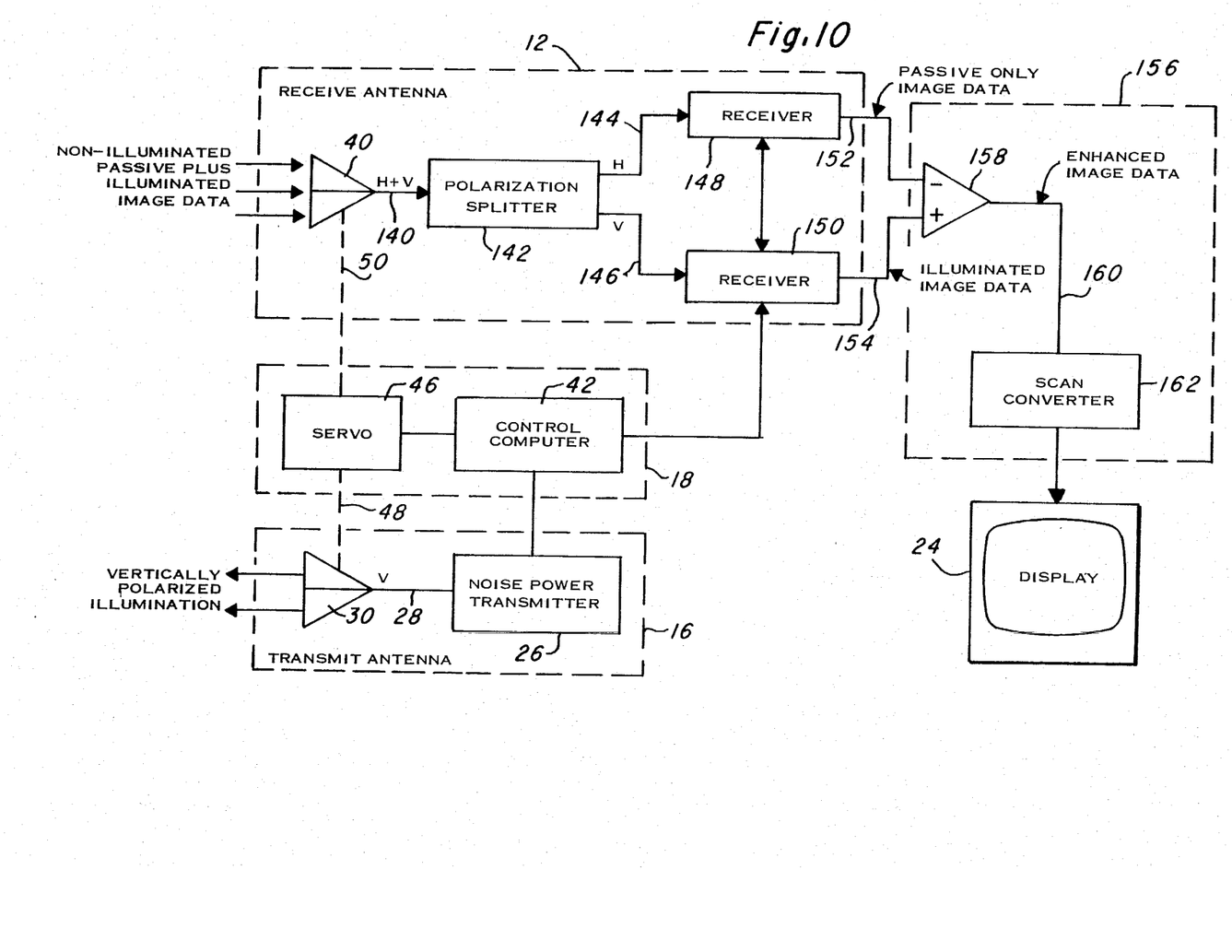
FIG. 10 is a block diagram of an alternate imaging system which utilizes the polarization properties of electromagnetic radiation.

FIG. 10 illustrates an alternate embodiment according to the present invention which utilizes the polarization properties of electromagnetic radiation to simultaneously measure the non-illuminated passive image data as well as the illuminated image data from target 14 (FIG. 1). Since the natural emissions of targets exist equally in both horizontal and vertical polarization planes, a radiometer which is sensitive to either horizontal or vertical polarization will provide the same output signal. If a radiometer is constructed which can receive both the horizontal and vertical polarizations as separate channels, and an illuminator is used with only a single polarization (either horizontal or vertical), then both the non-illuminated passive image data and the illuminated image data can be collected simultaneously. FIG. 10 illustrates such a transmitter and receiver combination.

Referring to FIG. 10, the illuminator 16 is comprised of a noise power transmitter 26 and transmit antenna 30 which generates electromagnetic energy having a first polarization (for example, for purposes of discussion and illustration, assume it is vertically polarized energy although for other applications horizontally polarized energy may be desirable). The transmit antenna 30 will deliver this vertically polarized electromagnetic energy to the target area 14 according to servo control 46 and line 48. Man-made and naturally reflective targets will generally reflect energy in the same polarization plane as the incident illuminated energy from transmit antenna 30. Therefore, receive antenna 40 and radiometer 12 will receive the vertically polarized electromagnetic energy from illuminator 16 from reflective targets as well as horizontally and vertically polarized natural emissions from target 14. These two polarization components are presented on line 140 to polarization splitter 142. Polarization splitter 142 separates the two polarization components, namely the horizontal component which is a representation of the non-illuminated passive thermal image of the target and the vertical polarization which is a representation of the illuminated thermal image of the target on lines 144 and 146, respectively. The horizontally polarized signal is input to receiver 148 while the vertically polarized signal is input to receiver 150. These two receivers 148 and 150 are functionally identical to the receiver shown in more detail in FIG. 6. The output 152 of the horizontal polarization receiver 148 will contain non-illuminated (passive only) image data whereas the output 154 of the vertical polarization receiver 150 will contain illuminated image data from target 14. The outputs 152 and 154 from receivers 148 and 150 are input to a processor 156 and, more particularly, to the negative and positive terminals, respectively, of difference amplifier 158. Amplifier 158 is not restricted to difference operation only, although this simplifies the explanation of principle. Amplifier 158 may, in certain embodiments, perform a difference or ratio of the various polarizations relative to average local surrounding area, as most appropriate to enhance the particular type of target. The non-illuminated passive thermal image is subtracted from the illuminated image data in difference amplifier 158 and the resulting enhanced image data is presented as an output on line 160. This output on line 160 is input to scan converter 162 which converts the real time enhanced image data into a format suitable for display on visual display means 24. When the two outputs 152 and 154 are subtracted, the resulting enhanced image data on line 160 is in the same form in the embodiment in FIGS. 1 and 6 except in the system of FIG. 10, only one scanning operation of the antennas is required; in other words, the non-illuminated as well as the illuminated thermal image data information is measured simultaneously.

A 36 GHz high resolution imaging radiometric system has been built and tested. The system consists of a ground based radiometer, a digital scan converter with digital memory, and a display. In addition to a real time TV display, images were recorded on video tape for subsequent viewing and image processing. The radiometer utilized a 26 inch diameter parabolic antenna and a gimbal mounted receiver. The antenna was manually scanned in azimuth and automatically incremented in elevation by a stepper motor. The intensity data was stored and displayed in a 128×64 pixel format. Table III lists the performance specifications of that radiometric system.

TABLE III

| Radiometer Specifications | |
|---|---|
| Antenna Beamwidth: | Elevation .90 degrees |
| | Azimuth .93 degrees |
| Antenna Gain: | 45.5 dB |
| IF Bandwidth: | 500 MHZ double sideband |
| RF Gain: | 60 dB |
| DC Gain: | 70-80 dB adjustable |
| Receiver Bandwidth: | 25 Hz, 100 Hz, 400 Hz (switchable) |
| Minimum Discernable: Temperature ($\Delta T_{min}$) | 1.6 K° @ 100 Hz bandwidth |
| Field of View: | Elevation - 10° to 40° (adjustable) |
| | Azimuth - 10° to 60° (adjustable) |
| Pointing Accuracy: | ±.25 degrees |

A laboratory type, variable frequency oscillator (HP628A) was used in conjunction with a frequency doubler (HP940A) to obtain the 36 GHz transmit power. A 20 dB horn was used to direct the illumination over the entire target area.

Although the present invention has been shown and illustrated in terms of a particular apparatus and method, it will be apparent that changes or modifications can be made without departing from the spirit and scope of the invention as defined by the appended claims.

What is claimed is:

1. A radiometric imaging system for sensing electromagnetic energy from a target area, comprising:

an illuminator means comprising a transmit antenna and transmitter means for producing random electromagnetic energy for illuminating said target area;

a radiometer comprising a receive antenna and receiver means, said radiometer for receiving and measuring the intensities of both the illuminated thermal image as well as the non-illuminated passive image from said target area in a predetermined frequency band, and means coupled to said radiometer for inverse filtering and subtracting the intensities of the non-illuminated target area from the intensities of the illuminated target area to provide enhanced target detection.

2. A radiometric imaging system according to claim 1 wherein the illuminator means generates electromagnetic energy having a preselected polarization and said radiometer further includes a polarization splitter operatively connected to the receive antenna for receiving the preselected polarized electromagnetic energy from the illuminator means and horizontally and vertically polarized natural emissions from the target area.

3. A radiometric system comprising:

(a) receiver means for receiving energy representative of images from an area, the receiver means including a receive antenna tuned to operate in the receiver band, a reference load and a calibration means for calibrating the first means for producing voltages proportional to the difference between the power received by the antenna and the power emitted by the reference load and an A/D converter means for digitizing the voltages;

(b) a display means including an image processing computer and a display means, the image processing computer operatively connected to the A/D converter for receiving the digitized outputs thereof and producing signals representative of the difference between preselected images of the area for display by the display means;

(c) illuminator means inlcuding a noise generating means and a transmitter means having a transmit antenna for transmitting the noise; and (d) control means including servo mechanism and control computer, the servo mechanism operatively connected to the receiver and transmitter and antennas and control computer for coordinating movement of the receive and transmit antennas over a target area and the control computer operatively connected to the calibration means of the receiver means, image processing means and illuminator means for operating: the illuminator means to illuminate selectively the target area; the receiver means to receive and digitize emissive energy and reflective energy from the target area; and the processing computer to store the digitized signals for passive and active images and subtract the digitized intensities of the passive image from the intensities of the illuminated image whereby highly reflective targets are differentiated from the emissive background terrain for enhanced target detection.

4. A radiometric imaging method for enhancing target detection and image contrast consisting of the steps of:

(a) generating a passive thermal image of the intensities from a target area:

(b) generating an active thermal image of the intensities from the target area;

(c) subtracting the intensities of the passive thermal image from the intensities of the active thermal image for forming a subtracted image; and (d) inverse filtering the subtracted image for providing an enhanced target detection.

5. A radiometric imaging method for enhancing target detection and image contrast consisting of the steps of:

(a) generating a passive thermal image of the intensities from a target area;

(b) generating an active thermal image of the intensities from the target area;

(c) inverse filtering the passive and active thermal images for improving their resolution; and (d) subtracting the inverse filtered passive and active thermal images for enhancing target detection in the target area.

6. A radiometric imaging method for enhancing target detection and image contrast consisting of the steps of:
   (a) generating a passive thermal image of the intensities from a target area;
   (b) generating an active thermal image of the intensities from the target area;
   (c) inverse filtering selectively the passive and active thermal images for improving their resolution; and
   (d) subtracting the passive thermal image from the active thermal image for enhancing target detection in the target area.

7. A radiometric imaging system comprising: a control computer system, a radiometer, an illuminator and a display means;
   the control computer system including a servo mechanism operatively connected to the radiometer and illuminator for selecting a target area, and a control computer for selectively controlling the radiometer for measuring the thermal intensity of a non-illuminated target area for activating the illuminator for illuminating the target area and for controlling the radiometer for measuring the intensity of the illuminated target area for the display means;
   the display means including an image processing computer operatively connected to the radiometer and control computer for subtracting the intensities of the non-illuminated and illuminated target area for providing enhanced target detection and a readout means for producing an enhanced image of any target in the target area;
   the radiometer including a receive antenna operatively connected to the servo mechanism for motion control, a reference load, a switch operatively connected to the receive antenna and reference load, a local oscillator, a double sideband mixer having first and second inputs operatively connected, respectively, to the local oscillator and selectively to the reference load and receive antenna, an amplifier operatively connected to the mixer, a diode detector connected to the amplifier, a low pass filter operatively connected to the diode detector for eliminating ripple and producing a dc signal at different levels proportional to the thermal energy sensed, a difference amplifier having a positive input terminal operably connected to the low pass filter, calibration circuitry operatively connected in two-way communication with the control computer of the control system and to the switch, a D/A converter operably connected to the calibration circuitry and negative terminal of the difference amplifier whereby when the switch is connected to the load reference the calibration circuitry applies an offset voltage to the negative terminal of the difference amplifier for ensuring that its output is zero for ensuring that when the switch is connected to the receive antenna the difference amplifier outputs a voltage proportional to the difference between the power received by the receive antenna and the power emitted by the reference load, an A/D converter operatively connected to the difference amplifier, the image processing computer of the display means and the calibration circuitry operatively connected to the A/D converter for receiving the digitized output of the difference amplifier;
   the illuminator having a noise diode for generating wideband random noise, at least one amplifier operatively connected to the noise diode for amplifying the noise, a bandpass filter for bandlimiting the amplified noise, a local oscillator, a double sideband mixer operatively connected to the local oscillator and bandpass filter for up-converting the noise signal to a preselected transmit frequency, a bandreject filter operatively connected to the mixer for removing the local oscillator frequency, a transmit amplifier operatively connected to the bandreject filter and the control computer of the control system, and a transmit antenna operatively connected to the transmit amplifier and servo mechnaism of the control system, respectively, for transmitting energy at a power level for a preselected time and for motion control.

* * * * *